US005670550A

United States Patent [19]
Jarvinen et al.

[11] Patent Number: 5,670,550
[45] Date of Patent: Sep. 23, 1997

[54] ION EXCHANGE POLYMERS FOR ANION SEPARATIONS

[75] Inventors: Gordon D. Jarvinen; S. Fredric Marsh, both of Los Alamos, N. Mex.; Richard A. Bartsch, Lubbock, Tex.

[73] Assignee: The Regents of the University of California Office of Technology Transfer, Alameda, Calif.

[21] Appl. No.: 476,964

[22] Filed: Jun. 7, 1995

[51] Int. Cl.$^6$ ............................ C08F 8/32; C08F 8/40; B01J 41/06
[52] U.S. Cl. ............... 521/32; 210/682; 210/684; 521/30; 521/31; 525/355; 525/379; 526/263; 526/265; 526/278
[58] Field of Search ................... 521/32, 30, 31; 526/265, 263, 278; 525/355, 379; 210/682, 684

[56] References Cited

U.S. PATENT DOCUMENTS

| | | | |
|---|---|---|---|
| 2,683,124 | 9/1954 | D'Alelio | 521/38 |
| 2,801,224 | 7/1957 | Greer | 521/32 |
| 4,154,615 | 5/1979 | Sato | 430/213 |

*Primary Examiner*—Fred Zitomer
*Attorney, Agent, or Firm*—Bruce H. Cottrell

[57] ABSTRACT

Anion exchange resins including at least two positively charged sites and a well-defined spacing between the positive sites are provided together with a process of removing anions or anionic metal complexes from aqueous solutions by use of such resins. The resins can be substituted poly (vinylpyridine) and substituted polystyrene.

10 Claims, No Drawings

ION EXCHANGE POLYMERS FOR ANION SEPARATIONS

FIELD OF THE INVENTION

The present invention relates to ion exchange resins and to a process of separating anions, including anionic metal complexes, using such ion exchange resins. This invention is the result of a contract with the United States Department of Energy (Contract No. W-7405-ENG-36).

BACKGROUND OF THE INVENTION

Polymer resins containing charged functional groups have been used for many years to recover anions and cations from solution. The fixed charged functional groups on the resin require counterions of opposite charge to maintain overall electroneutrality. In contact with a solution, anions or cartons present in the solution may exchange with groups of the same charge bound electrostatically to the charged polymer sites, hence the term "ion exchange" for this process. One useful feature of this ion exchange process is the ease of separating solid resin from the treated solution. The ion exchange equilibria for a particular resin structure and solution composition are driven by a variety of thermodynamic and kinetic factors that are still only partially predictable.

One resin property of great importance for industrial applications is the selectivity for binding particular metal ions from solution. Useful ion exchange resins preferentially bind a target metal ion over other metal ions. The desire to remove the target metal ion may result for a variety of reasons including greater value of the target metal (e.g., gold versus iron), greater toxicity of the target metal (e.g., mercury versus sodium), or deleterious effects of the target metal ion on subsequent operations (e.g., lead poisoning of catalytic converters).

It is an object of this invention to provide anion exchange resins for removal of target anions or anionic metal complexes from solution.

Another object of the present invention is to provide a process for removal of target anions or anionic metal complexes from solution using the anion exchange resins.

SUMMARY OF THE INVENTION

To achieve the foregoing and other objects, and in accordance with the purposes of the present invention, as embodied and broadly described herein, the present invention provides anion exchange resins having substantial repeating units of a type selected from the group consisting of (a)

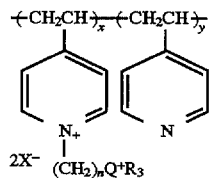

wherein Q is phosphorus, each R is the same and is an alkyl having from 1 to about 6 carbon atoms, n is an integer from 1 to 6, x+y=1 and x is from about 0.2 to about 1.0, and $X^-$ is a counterion, (b)

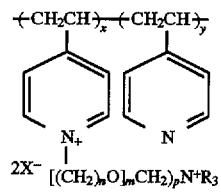

wherein each R is the same and is an alkyl having from 1 to about 6 carbon atoms, n is an integer from 1 to 6, m is an integer from 1 to 4, p is an integer from 1 to 6, x+y=1 and x is from about 0.2 to about 1.0, and $X^-$ is a counterion, (c)

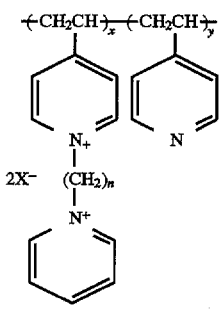

wherein n is an integer from 2 to 6, x+y=1 and x is from about 0.2 to about 1.0, and $X^-$ is a counterion, (d)

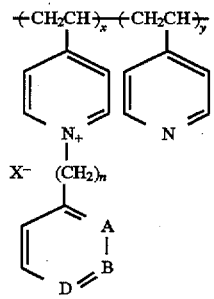

wherein one of A, B and D is nitrogen, n is an integer from 2 to 6, x+y=1 and x is from about 0.2 to about 1.0, and $X^-$ is a counterion, and (e)

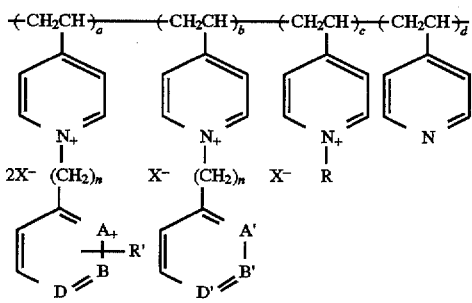

wherein one of A, B and D is nitrogen and one of A', B' and D' is nitrogen, each R and R' is an alkyl having from 1 to about 6 carbon atoms, R' is attached to said A, B or D which is nitrogen, n is an integer from 1 to 6, a+b+c+d=1 and a+b is from about 0.2 to about 1.0, and $X^-$ is a counterion.

The present invention further provides a method of separating anions or anionic metal complexes from an aqueous solution including contacting a solution containing a target anion with an anion exchange resin of substantial repeating units of a type selected from the group consisting of: (a)

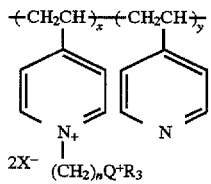

wherein Q is nitrogen or phosphorus, each R is the same and is an alkyl having from 1 to about 6 carbon atoms, n is an integer from 2 to 6 when Q is nitrogen and an integer from 1 to 6 when Q is phosphorus, x+y=1 and x is from about 0.2 to about 1.0, and $X^-$ is a counterion, (b)

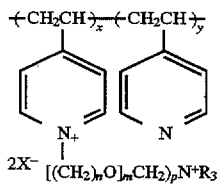

wherein each R is the same and is an alkyl having from 1 to about 6 carbon atoms, n is an integer from 1 to 6, m is an integer from 1 to 4, p is an integer from 1 to 6, x+y=1 and x is from about 0.2 to about 1.0, and $X^-$ is a counterion, (c)

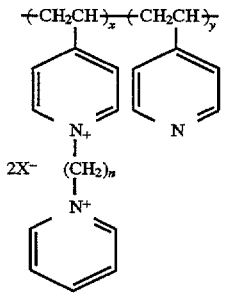

wherein n is an integer from 2 to 6, x+y=1 and x is from about 0.2 to about 1.0, and $X^-$ is a counterion, (d)

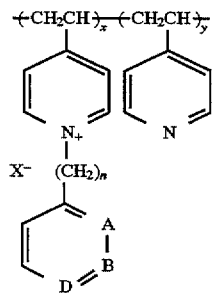

wherein one of A, B and D is nitrogen, n is an integer from 1 to 6, x+y=1 and x is from about 0.2 to about 1.0, and $X^-$ is a counterion, and (e)

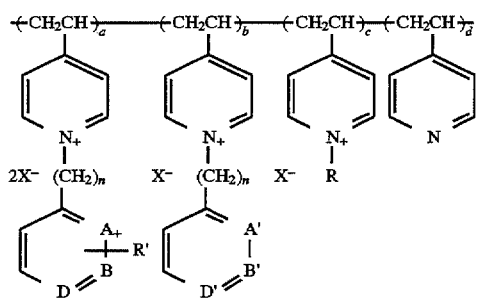

wherein one of A, B and D is nitrogen and one of A', B' and D' is nitrogen, each R and R' is an alkyl having from 1 to about 6 carbon atoms, R' is attached to said A, B or D which is nitrogen, n is an integer from 1 to 6, a+b+c+d=1 and a+b is from about 0.2 to about 1.0, and $X^-$ is a counterion, under conditions suitable for sorption of said target anions or anionic metal complexes by the anion exchange resin, and, contacting said anion exchange resin including sorbed target anions or anionic metal complexes with an aqueous solution having properties suitable for separation of said target anions or anionic metal complexes from the anion exchange resin.

DETAILED DESCRIPTION

The present invention is concerned with anion exchange resins and the use of such anion exchange resins in the separation of anions or anionic metal complexes. The present anion exchange resins demonstrate higher selectivity and faster sorption kinetics for removing plutonium from nitric acid/nitrate salt solutions, thereby resulting in increased efficiency and decreased costs in such separations. The present invention includes polymer resins with repeating units containing two positively charged functional groups with a well-defined and reproducible spacing fixed by the chemical structure or one positively charged functional group and one neutral functional group capable of protonation in acidic media to form a second positively charged functional group, also with a well-defined and reproducible spacing between the charged groups.

The anion exchange resins of the present invention generally contain at least two positively charged sites with a defined spacing therebetween or contain at least one positively charged site and at least one neutral site capable of protonation in acidic media to yield at least one additional positively charged site also with a defined spacing therebetween. The defined spacing can be selectively controlled in the preparation of the anion exchange resin, e.g., by selection of spacer groups such as alkylene groups, oxy alkylene groups and the like. By control of the positive sites and the spacing therebetween, selectivity and kinetics of the anion exchange resin in a separation process can be controlled and enhanced.

The anion exchange resins of the present invention can generally be used for separation and/or recovery of anions and anionic metal complexes. Included among the recoverable anionic metal complexes is plutonium hexanitrido [$Pu(NO_3)_6^=$]. Other recoverable species may include [$UO_2(CO_3)_2^{2-}$] or [$UO_2(CO_3)_3^{4-}$]. Additionally, a series of experiments has been performed to evaluate the general anion exchange properties of these resins. The experimental procedure involved converting the resin to a form containing only chloride counterions by washing with concentrated chloride solutions. The chloride form of the resin was placed in a column and a solution containing a known concentration of a different anion (such as sulfate, phosphate, nitrate and the like) was passed through the column until all the chloride anions were displaced (as measured by ion chromatography). The volume of aqueous solution required to displace the chloride gave a relative measure of the strength of binding of the second anion to the ion exchange resin.

In this way, the following general order was established (from strongest to weakest binding): oxalate>sulfate>nitrate>nitite ~HPO$_4^=$>bromide~H$_2$PO$_4^-$>acetate. While this general order is similar to that for other anion exchange resins, the magnitude of the differences in binding was found to be substantially influenced by the spacing between the two positively charged sites and the particular functional group providing the second cationic site (e.g., trimethylammonium, pyridinium and the like). Thus, these features of the resin can be controlled to accomplish specific anion separations more efficiently.

One property of the present anion exchange resins is especially low binding to plutonium at dilute nitric acid (HNO$_3$) concentrations of about 0.1 Molar (M) to about 1M, i.e., at a pH of about 0 to 1, but high binding of plutonium at strong nitric acid concentrations, i.e., about 5M to 7M HNO$_3$. Thus, dilute nitric acid can be used to elute or recover sorbed plutonium from the anion exchange resin with particular ease and completeness and thus regenerate the resin for further use. This weaker sorption from dilute nitric acid allows plutonium to be recovered more quickly at higher concentrations and in a smaller volume of eluate.

The anion exchange resins of the present invention include polymer resins with repeating units containing two positively charged functional groups with a well-defined spacing fixed by the chemical structure or include polymer resins with repeating units containing one positively charged functional group and a neutral group capable of protonation within acidic media to yield a positively charged functional group with a well defined spacing fixed by the chemical structure. The two positively charged functional groups can each be, e.g., quaternary nitrogens, or a quaternary nitrogen and a quaternary phosphorus.

Generally, the anion exchange resins of the present invention consist of a poly(vinylpyridine) polymer structure with appropriate substitution. However, other polymer structures such as polystyrene can also be functionalized to produce resins with repeating units containing two positively charged functional groups having reproducible spacing. With poly(vinylpyridine) as the basic polymer structure, generally from about 30 to about 80 percent of the pyridine groups are functionalized, preferably from about 60 to about 75 percent, thereby yielding a first positively charged functional group. The substitution includes the selected defined spacing connecting to either a second positively charged functional group or a neutral functional group capable of protonation in acidic media to yield a second positively charged functional group.

Excessive functionalization of the pyridine group typically leads to a material which is too hydrophobic to allow for effective anion or anionic metal complex separations in aqueous media. Insufficient functionalization of the pyridine group typically results in inadequate anion exchange capacity by the resin thus increasing the size of the ion exchange column needed for a particular separation. Depending upon the particular starting material for the quaternization reaction, the degree of functionalization will vary. Examples of poly(vinyl pyridine) that can be substituted include Reillex™ HP poly(vinyl pyridine) resin and Reillex™ 402 poly(vinyl pyridine) resin. Reillex™ HP poly(vinyl pyridine) resin is typically about 25 to 30 percent crosslinked with divinyl benzene and Reillex™ 402 poly(vinyl pyridine) resin is typically about 2 percent crosslinked with divinyl benzene. Both resins are available from Reilly Industries, Inc.

The anion exchange resin generally includes substantial repeating units of the type: (a)

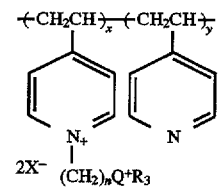

wherein Q is nitrogen or phosphorus, each R is the same and is an alkyl having from 1 to about 6 carbon atoms, n is an integer from 2 to 6 when Q is nitrogen and an integer from 1 to 6 when Q is phosphorus, x+y=1 and x is from about 0.2 to about 1.0, and X$^-$ is a counterion, (b)

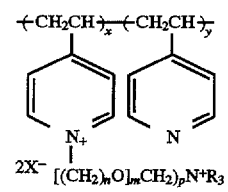

wherein each R is the same and is an alkyl having from 1 to about 6 carbon atoms, n is an integer from 1 to 6, m is an integer from 1 to 4, p is an integer from 1 to 6, x+y=1 and x is from about 0.2 to about 1.0, and X$^-$ is a counterion, (c)

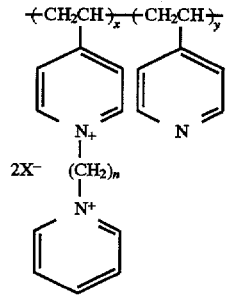

wherein n is an integer from 1 to 6, x+y=1 and x is from about 0.2 to about 1.0, and X$^-$ is a counterion, (d)

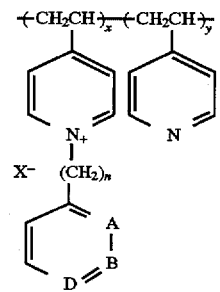

wherein one of A, B and D is nitrogen, n is an integer from 1 to 6, x+y=1 and x is from about 0.2 to about 1.0, and X$^-$ is a counterion, or (e)

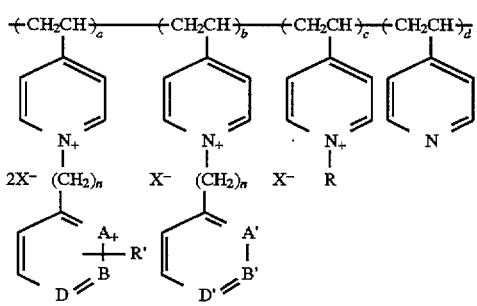

wherein one of A, B and D is nitrogen and one of A', B' and D' is nitrogen, each R and R' is an alkyl having from 1 to about 6 carbon atoms, R' is attached to said A, B or D which is nitrogen, n is an integer from 1 to 6, a+b+c+d=1 and a+b is from about 0.2 to about 1.0 and X⁻ is a counterion. More preferably, the alkyl groups in the above structures have from 1 to 4 carbon atoms because greater than about 4 carbon atoms can result in the resin being too hydrophobic for effective anion or anionic metal complex separations from aqueous solutions. Similarly, x and a+b are more preferably from about 0.2 to about 0.8 and most preferably from about 0.60 to 0.75 as greater values can result in the resin being too hydrophobic for effective anion or anionic metal complex separations from aqueous solutions. In the above structures, the pyridine group on the —(CH$_2$CH$_2$)$_y$— unit and the —(CH$_2$CH$_2$)$_d$— unit can be either in the free base or the acid form.

The anion exchange resin shown in structure (b) can also be easily modified during preparation to have the follow structure:

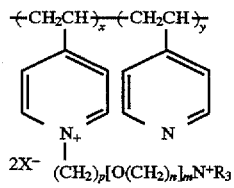

wherein each R is the same and is an alkyl having from 1 to about 6 carbon atoms, n is an integer from 1 to 6, m is an integer from 1 to 4, p is an integer from 1 to 6, x+y=1 and x is from about 0.2 to about 1.0, and X⁻ is a counterion.

The anion exchange resins can generally be prepared by functionalization of, e.g., poly(vinyl pyridine) resins such as Reillex™ HP poly(vinyl pyridine) resin and Reillex™ 402 poly(vinyl pyridine) resin, with several different types of alkylating agents. One type of alkylating agent can be ω-bromoalkyl-trimethylammonium bromides. Another related type of alkylating agent can be a ω-bromoalkyl-trimethylammonium bromide with the alkyl containing an oxygen atom in the alkyl group unit, e.g., a CH$_2$CH$_2$OCH$_2$CH$_2$ group instead of a (CH$_2$)$_5$ group.

Of the desired ω-bromoalkyl-trimethylammonium bromides with the alkyl being from a (CH$_2$)$_2$ to a (CH$_2$)$_6$ only the bromide with the (CH$_2$)$_2$ is commercially available. Preparation of the other ω-bromoalkyl-trimethylammonium bromides generally followed the procedure described by Gray et at., *J. Am. Chem. Soc.*, v. 77, p. 3648 (1955) for alkylation of 1, ω-dibromoalkenes with trimethylamine in benzene. By this developed procedure, the amount of any contaminating disubstitution product was kept under about 5 percent with overall yields of from about 61 to about 85 percent. With this basic procedure, the similar oxygen atom-containing alkylating agent was prepared in 46 percent yield. Another similar alkylating agent can be ω-bromoalkyl-trimethylphosphonium.

Reaction of the ω-bromoalkyl-trimethylammonium bromides with poly(4-vinylpyridine) in ethanol at reflux for 10 days yielded alkylation of a portion of the pyridine nitrogens in the resin. (Although these reactions were initially performed at atmospheric pressure, pressurized reactions have been adopted to increase the reaction rate). Generally, from about 60 to 100 percent of the pyridine nitrogens were alkylated to yield ω-trimethylammoniumalkyl-substituted repeating units.

Another type of alkylating agent can be ω-bromoalkylpyridinium bromides which are not commercially available but which can be prepared from reactions of pyridine with 1,ω-dibromoalkanes as described, e.g., by Duling et at., *J. Am. Chem. Soc.*, v. 84, p.578 (1962). As the monosubstitution product often may be found to be heavily contaminated with the product of disubstitution, the present synthetic procedure involved reaction of pyridine with a considerable excess of the appropriate 1,ω-dibromoalkane in acetone (for (CH$_2$)$_2$) or benzene (for (CH$_2$)$_{3-6}$). The alkylating agents with (CH$_2$)$_2$ to (CH$_2$)$_4$ could be obtained as the monoalkylated products alone whereas for (CH$_2$)$_5$ and for (CH$_2$)$_6$ the resultant alkylating agents were contaminated with about 12 percent of the disubstimtion product.

Reaction of the ω-bromoalkylpyridinium bromides with poly(4-vinylpyridine) in ethanol at reflux for 10 days generally yielded alkylation of from about 64 to about 85 percent of the pyridine nitrogens in the resin.

Still other alkylating agents used to prepare the anion exchange resins were the 3- and 4-picolyl chlorides which were generated in situ from commercially available hydrochloride salts. The 3-picolyl-substituted poly(4-vinylpyridine) resin was prepared by reaction of 3-picolyl chloride hydrochloride, potassium carbonate and poly(4-vinylpyridine) in ethanol at reflux for 10 days. The substitution level was about 60 percent. Methylation of the product by reaction with excess iodomethane in ethanol at reflux for three days gave a methylated product with about 83 percent substitution. A similar process with the 4-picolyl chloride gave a substitution level of about 45 percent and subsequent methylation gave 97 percent methylation. In acidic aqueous media, the resins including substantial repeating units with the structure:

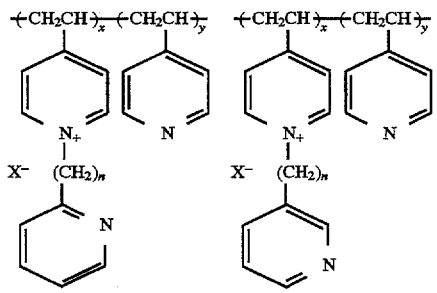

and

-continued

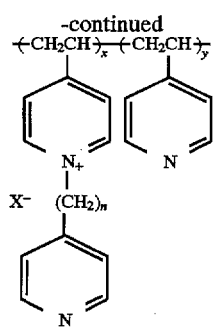

protonate on the pyridine nitrogens of the substituent groups thereby forming a repeating unit with two positive charges.

Polystyrene may be functionalized in the same manner as poly(vinyl pyridine) to provide suitable anion exchange resins in accordance with the present invention. For example,

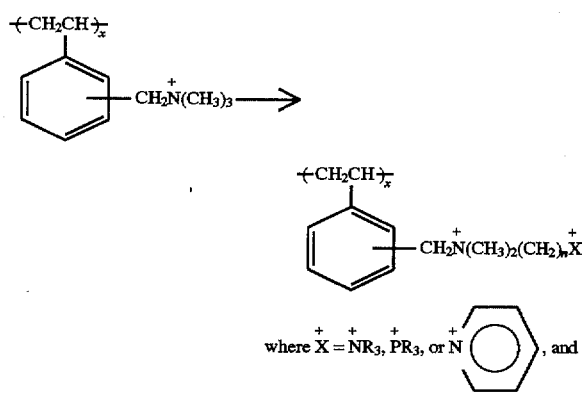

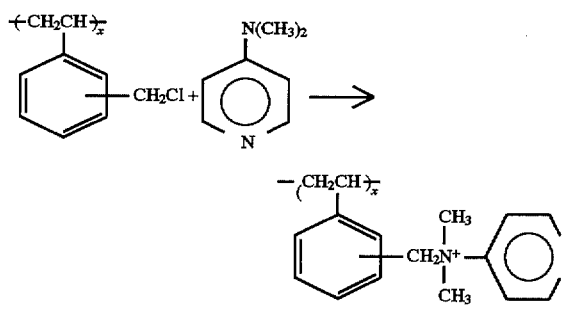

whereafter the polystyrene reaction product can be further reacted with an alkyl halide to yield the second positively charged group. In the above cases, the initial starting material can include instead a single methyl group and a hydrogen on the nitrogen such that the one nitrogen would become positively charged upon protonation in acid. Ortho and meta isomers of the dimethylaminopyridine can also be used. Additionally, materials such as chloromethyl-substituted polystyrene can be reacted with various hydroxyalkyl-substituted pyridines such as hydroxymethylpyridine, hydroxyethylpyridine, or hydroxypropylpyridine, which may then be further reacted similar to the poly(vinyl pyridine)s to yield a suitable resin. A material such as that shown above including an oxygen in the spacer between the charged groups may also be used to separate the polystyrene and the second charged group.

The present invention is more particularly described in the following examples which are intended as illustrative only, since numerous modifications and variations will be apparent to those skilled in the art.

EXAMPLE 1

Preparation of ω-Bromoalkyltrimethylammonium bromides was as follows. In a fume hood, 10.00 grams (g) of the 1,ω-dibromoalkane, 150 milliliters (mL) of dry benzene and a magnetic stirring bar were placed in a 250 -mL, three-necked flask. Into one side neck of the flask was inserted a glass tube with a drawn tip which extended below the surface of the benzene solution. The other end of the glass tube was connected to a cylinder of trimethylamine gas with rubber tubing. A glass stopper was placed in the middle neck of the flask. To the second side neck of the flask was attached a calcium chloride drying tube. Magnetic stirring was commenced at room temperature and trimethylamine gas was introduced into the benzene solution at a rate of approximately one bubble/five seconds for a two-hour period. The trimethylamine addition tube was replaced with a glass stopper and the reaction mixture was stirred at room temperature for 12–16 hours. The white precipitate was filtered and dried in vacuo. The ratio of the product to 1,ω-di (trimethylammonio)alkane dibromide (the disubstitution product) was estimated from the $^1$H NMR spectrum of the product in $CDCl_3$—$_{CD3}S(O)CD_3$.

3-Bromopropyltrimethylammonium bromide was obtained in a 74% yield as a 97:3 mixture of the monosubstitution and disubstitution products.

4-Bromobutyltrimethylammonium bromide was obtained in 61–83% yields uncontaminated with the disubstitution product.

5-Bromopentyltrimethylammonium bromide was obtained in an 82% yield as a 95:5 mixture of the monosubstitution and disubstitution products.

6-Bromohexyltrimethylammonium bromide was obtained in 81–85% yields uncontaminated with the disubstitution product.

EXAMPLE 2

Preparation of 5-Bromo-3-oxapentyltrimethylammonium bromide was as follows. The procedure given above for ω-bromoalkyltrimethylammonium bromides was modified by use of a 500-mL, three-necked flask, 20.00 g (86.2 mmol) of bis(2-bromoethyl) ether, and 220 mL of benzene to give 11.46 g (46%) of white solid with a melting point of 105°–107° C. $^1$H NMR($CDCl_3$—$CD_3S(O)CD_3$):δ3.35(s, 9 H), 3.55–3.62 (m,2 H), 3.77–4.03 (m,6). Elemental analysis: Calculated for $C_7H_{17}Br_2NO$: C, 28.89; H, 5.89: N, 4.81; Br, 54,91. Found: C, 29.28: H, 5.83: N, 4.91: Br, 54.70.

EXAMPLE 3

Preparation of ω-trimethylammoniumalkyl-substituted poly(4-vinylpyridine)s was as follows. A mixture of 5.00 g of the respective ω-bromoalkyltrimethylammonium bromide from Example 1 and an equimolar amount of Reillex™ 402 poly(4vinylpyridine) in 380 mL of absolute ethanol (alternatively 7.00 g of the ω-bromoalkyltrimethylammonium bromide and an equimolar amount of poly(4-vinylpyridine) in 530 mL of ethanol) was refluxed for 10 days. At room temperature the mixture was filtered with a sintered glass funnel. The solid was washed on the funnel with ethanol (3×20 mL) and water (2×20 mL). The resulting solid was added to 200 mL of benzene and water was removed from the mixture at reflux with a Dean-Stark trap. The benzene was removed from the mixture in vacuo and the residue was dried in vacuo overnight to give the white product resin. The level of substitution was calculated from the percentage of bromine in the resin.

Resin (1) from 2-Bromoethyltrimethylammonium bromide, 10.10 g. Elemental analysis: Calculated: Br, 37.85 for 60% substitution. Found: Br, 37.82. In this resin structure, x=0.60 and y=0.40. (A substitution level of 62% was obtained in another synthesis of the same resin).

Resin (2) from 3-Bromopropyltrimethylammonium bromide, 13.32 g. Elemental analysis: Calculated: Br, 42.44 for 91% substitution. Found: Br, 42,48. In this resin structure, x=0.91 and y=0.09.

Resin (3) from 4-Bromobutyltrimethylammonium bromide, 20.58 g (from a 7.00-gram scale reaction). Elemental analysis: Calculated: Br, 40.23 for 86% substitution. Found: Br, 40.19. In this resin structure, x+0.97 and y=0.03.

Resin (4) from 5-Bromopentyltrimethylammonium bromide, 18.66 g (from a 7.00-gram scale reaction). Elemental analysis: Calculated: Br, 40.21 for 97% substitution. Found: Br, 40.05. In this resin structure, x=0.97 and y=0.03.

Resin (5) from 6-Bromohexyltrimethylammonium bromide, 15.68 g (from a 7.00-gram scale reaction). Elemental analysis: Calculated: Br, 39.15 for 100% substitution. Found: Br, 39.41. In this resin structure, x=1.00 and y=0.00.

Resin (15) from 5-Bromo-3-oxapentyltrimethylammonium bromide, 19.31 g (from a 7.00-gram scale reaction). Elemental analysis: Calculated: Br, 35.49 for 66% substitution. Found: Br, 35.53. In this resin structure, x=0.66 and y=0.34.

EXAMPLE 4

Preparation of (2-bromoethyl)-1-pyridinium bromide was as follows. A solution of 16.00 grams (0.20 mol) of pyridine, 187.86 grams (1 mole) of 1,2-dibromoethane and 500 ml of dry acetone was refluxed for 15 hours. At room temperature the mixture was filtered with a sintered glass funnel. The filtered solid was dried in vacuo to give 13.51 g (25%) of white solid. The $H^1$ NMR spectrum of the product showed it to be uncontaminated by the disubstitution product.

Preparation of other (ω-bromoalkyl)1-pyridinium bromides was as follows. Pyridine (3.96 g, 0.050 mole) and the 1,ω-dibromoalkane (0.50 mole) in 50 mL of dry benzene were refluxed for 6 hours and allowed to stir overnight at room temperature. At room temperature, the mixture was filtered with a sintered glass funnel. The filtered solid was dried in vacuo. The $^1H$ NMR spectrum of the resulting solid was used to assess the relative proportions of monosubstituted and disubstituted products.

3-Bromopropyl-pyridinium bromide was obtained in quantitative yield and was uncontaminated with the disubstitution product.

4-Bromobutyl-1-pyridinium bromide was obtained in quantitative yield and was uncontaminated with the disubstitution product.

5-Bromopentyl-1-pyridinium bromide was obtained in 91% yield as a mixture of 88% monosubstitution product and 12% disubstitution product.

6-Bromohexyl-1-pyridinium bromide was obtained in 91% yield as a mixture of 88% monosubstitution product and 12% disubstitution product.

EXAMPLE 5

Preparation of ω-pyridiniumalkyl-substituted poly(4-vinylpyridine)s was as follows. With the modification of utilizing 5.00 g of an ω-bromoalkylpyridinium bromide as the alkylating agent, the procedure reported above for the preparation of the resins in example 3 was utilized to give white product resins. The level of substitution was calculated from the percentage of bromine in the resins.

Resin (6) from (2-bromoethyl)-1-pyridinium bromide, 9.71 g. Elemental analysis: Calculated: Br, 37.54 for 64% substitution. Found: Br, 37.52. In this resin structure, x=0.64 and y=0.36.

Resin (7) from (3-bromopropyl)-1-pyridinium bromide, 5.61 g (from a 2.00-gram scale reaction). Elemental analysis: Calculated: Br, 38.27 for 77% substitution. Found: Br, 38.23. In this resin structure, x=0.77 and y=0.23.

Resin (8) from (4-bromobutyl)-1-pyridinium bromide, 11.45 g. Elemental analysis: Calculated: Br, 38.03 for 83% substitution. Found: Br, 37.98. In this resin structure, x=0.83 and y=0.17.

Resin (9) from (5-bromopentyl)-1-pyridinium bromide, 12.04 g. Elemental analysis: Calculated: Br, 35.72 for 76% substitution. Found: Br, 35.71. In this resin structure, x=0.76 and y=0.24.

Resin (10) from (6-bromohexyl)-1-pyridinium bromide, 12.18 g. Elemental analysis: Calculated: Br, 35.77 for 85% substitution. Found: Br, 35.80. In this resin structure, x=0.85 and y=0.15.

EXAMPLE 6

Preparation of 3-picolyl-substituted poly(4-vinylpyridine) was as follows. A mixture of 10.00 g (95.11 mmol) of Reillex™ 402 poly(4-vinylpyridine), 16.60 g (95.11 mmol) of 3-picolyl chloride hydrochloride, and 6.92 g (50.06 mmol) of anhydrous potassium carbonate in 650 mL of absolute ethanol was refluxed for 10 days. At room temperature the mixture was filtered with a sintered glass funnel. The solid was washed on the funnel with ethanol (3×20 mL) and water (2×20 mL). The resin was added to 200 mL of benzene and water was removed from the mixture at reflux with a Dean-Stark trap. The benzene was removed from the mixture in vacuo and the residue was dried in vacuo overnight to give 15.064 g of the tan product (resin 11). The level of substitution was calculated from the percentage of chlorine in the resin. Elemental analysis: Calculated: Cl, 11.71 for 60% substitution. Found: Cl, 11.73. In this resin structure, x=0.60 and y=0.40.

EXAMPLE 7

Preparation of methylated 3-picolyl-substituted poly(4-vinylpyridine) was as follows. A mixture of 7.00 g of the resin from Example 6 and excess of iodomethane (9.45 g) in 530 mL of absolute ethanol was refluxed for 3 days. At room temperature, the mixture was filtered with a sintered glass funnel and the solid was washed on the funnel with ethanol (3×20 mL). The residue was dried in vacuo overnight to give 12.81 g of pale yellow product (resin 13). Elemental analysis revealed the absence of chlorine in the resin. Apparently the chloride ion in the resin reacted with the excess iodomethane to give iodide ion and chloromethane. Therefore iodide is the only halide ion present in the resin. The level of methylation of the resin was calculated from the percentage of iodine in the product resin. Elemental analysis: Calculated: I, 51.21 for 83% methylation. Found: I, 51.27. In this resin structure, a=0.504, b=0.096, c=0.336 and d=0.064. Note that in this resin structure, a+b=0.60 and c+d=0.40.

EXAMPLE 8

Preparation of 4-picolyl-substituted poly(4-vinylpyridine) was as follows. With the modification of using 4-picolyl chloride hydrochloride instead of 3-picolyl chloride hydrochloride, the procedure reported above for the preparation of the resin in example 6 was followed to give 14.73 g of a red-brown product (resin 12). The level of substitution was calculated: Cl, 9.81 for 45% substitution. Found: Cl, 9.86. In this resin structure, x=0.45 and y=0.55.

EXAMPLE 9

Preparation of methylated 4-picolyl-substituted poly(4-vinylpyridine) was as follows. With the modification of using the resin from example 8 instead of the resin from example 6, the procedure reported above for the preparation of the resin in example 7 was followed to give 13.45 g of yellow-brown product (resin 14). The level of methylation of the resin was calculated from the percentage of iodine in the product resin. Elemental analysis: Calculated: I, 52.84% for 97% methylation. Found: I, 52.77. In this resin structure, a=0.4365, b=0.0135, c=0.5335 and d=0.0165. Note that in this resin structure, a+b=0.45 and c+d=0.55.

EXAMPLE 10

Preparation of ω-bromoalkyltrimethylphosphonium bromides was as follows. In a hood, a solution of 60 mL of 1.0M trimethylphosphine (0.060 mol) in toluene was placed in a round bottom flask and a reflux condenser was attached. Into the condenser was added 0.10 mole of the 1,ω-dibromoalkane. The container into which the 1,ω-dibromoalkane was weighed was rinsed with 5 mL of toluene and the rinse solution was also added down the condenser. The reaction mixture was stirred at room temperature for 3 days and filtered with a sintered glass funnel. The solid was washed on the funnel with cold benzene and dried in vacuo to give a white solid. The $^1$H NMR spectrum of the product in $CD_3(O)CD_3$ showed that only monosubstituted product was obtained.

2-Bromoethyltrimethylphosphonium bromide was obtained using three times the scale given in the general procedure and a reaction time of 4 days. The reaction produced 22.07 g (46%) of a white solid, mp 250°–255° C. $^1$H NMR ($CD_3S(O)CD_3$): δ 1.89 and 1.96 (d, 9 H), 2.87–3.04 (m, 2 H), 3.72–3.87) (m, 2 H). Elemental analysis: Calculated for $C_5H_{13}PBr_2$: C, 22.75: H, 4.96. Found: C, 22.99: H, 4.89.

3-Bromopropyltrimethylphosphonium bromide was similarly obtained in 89% yield, 4-bromobutyltrimethylphosphonium bromide was similarly obtained in 89% yield, and 5-bromopentyltrimethylphosphonium bromide was similarly obtained in 77% yield.

EXAMPLE 11

Preparation of ω-trimethylphosphoniumalkyl-substituted poly(4-vinylpyridine) was as follows. A mixture of 5.00 g (47.56 mmol) of Reillex™ 402 poly(4-vinylpyridine) and 47.56 mmol of the 2-bromoalkyltrimethylphosphonium bromide in 375 mL of absolute ethanol was refluxed for 10 days. At room temperature, the mixture was filtered with a sintered glass funnel and the solid was washed on the funnel with ethanol (3×20 mL) and water (2×20 mL). The resulting solid was added to 200 mL of benzene and water was removed from the mixture at reflux with a Dean-Stark trap. The benzene was removed from the mixture in vacuo and the residue was dried in vacuo overnight to give the white product resin. The level of substitution was calculated from the percentage of phosphorus in the resin.

Resin (16) from 2-bromoethyltrimethylphosphonium bromide, 9.71 g. Elemental analysis: Calculated: P, 2.16 for 9% substitution. Found: P, 2.202. In this resin structure, x=0.09 and y=0.91.

Resin (17) from 3-bromopropyltrimethylphosphonium bromide, 14.04 g. Elemental analysis: Calculated: P, 6.34 for 50% substitution. Found: P, 6.35. In this resin structure, x=0.50 and y=0.50.

Resin (18) from 4-bromobutyltrimethylphosphonium bromide, 13.98 g. Elemental analysis: Calculated: P, 5.89 for 45% substitution. Found: P, 5.91. In this resin structure, x=0.45 and y=0.55.

Resin (19) from 5-bromopentyltrimethylphosphonium bromide, 13.93 g. Elemental analysis: Calculated: P, 5.38 for 39% substitution. Found: P, 5.35. In this resin structure, x=0.39 and y=0.61.

EXAMPLE 12

Generally, a 250-milligram (rag) portion of each air-dried resin was contacted with a measured 6 milliliter (mL) volume of each solution in a specially modified 20 mL disposable hypodermic syringe. The syringes were modified by inserting cylindrical plugs cut from quarter-inch-thick porous Kynar, obtained from Porex Technologies, Fairburn, Ga., into the tapered tips as filters, which permitted only liquid to pass therethrough.

For each set of experiments, six syringes were selected, each containing a different resin. A measured volume of the selected solution was transferred by piper into a plastic beaker and then drawn into a syringe through the Kynar filter. The tip of each syringe was then sealed with a solid Luer cap and the syringes were placed on a 48-rpm tube rotator for dynamic contact periods of 30 min, 2 h and 6 h. At the end of each contact period, approximately 25% of the total solution volume was expelled through the filtered tip of the syringe into a tared counting vial. The dispensed solution was then weighed and that figure used in the calculation of Kd values shown below in Tables 1–4.

Each portion of postcontact solution was assayed by gamma spectrometry for specific gamma energies of the added radionuclides, such as the 129 keV of $^{239}$P. The fraction of each element sorbed was determined indirectly from the difference in the measured gamma activity of the selected radionuclide before and after contact with each specified absorber.

The Kd value of each element was calculated as follows:

$$Kd = (Pr - Po/Po)(S/A)$$

where
Pr=measured precontact activity per mL,
Po=measured postcontact activity per mL,
S=milliliters of solution contacted, and
A=grams of dry absorber contacted.

TABLE 1

| | Measured Kds of Pu(IV) from nitric acid | | | | | | |
|---|---|---|---|---|---|---|---|
| [HNO$_3$] | Contact Time | Reillex HPQ | resin 1 | resin 2 | resin 3 | resin 4 | resin 5 |
| 1M | 30 min | 6.7 | 1.3 | 2.5 | 1.2 | 1.7 | 1.6 |
| 1M | 2 hrs | 7.1 | 1.4 | 1.5 | 1.5 | 1.1 | 1.7 |
| 1M | 6 hrs | 6.8 | 1.3 | 1.7 | 1.4 | 1.3 | 1.3 |
| 3M | 30 min | 69 | 30 | 37 | 40 | 61 | 73 |
| 3M | 2 hrs | 97 | 30 | 39 | 41 | 63 | 79 |
| 3M | 6 hrs | 100 | 29 | 38 | 41 | 60 | 81 |

TABLE 1-continued

Measured Kds of Pu(IV) from nitric acid

| [HNO₃] | Contact Time | Reillex HPQ | resin 1 | resin 2 | resin 3 | resin 4 | resin 5 |
|---|---|---|---|---|---|---|---|
| 5M | 30 min | 233 | 390 | 537 | 599 | 686 | 765 |
| 5M | 2 hrs | 412 | 408 | 574 | 645 | 910 | 990 |
| 5M | 6 hrs | 372 | 397 | 567 | 662 | 999 | 1010 |
| 7M | 30 min | 490 | 2131 | 2950 | 3459 | 3484 | 2092 |
| 7M | 2 hrs | 850 | 2718 | 4032 | 3502 | 4263 | 2638 |
| 7M | 6 hrs | 683 | 2319 | 3164 | 3679 | 3803 | 2391 |
| 9M | 30 min | 378 | 2894 | 3160 | 3900 | 3554 | 2122 |
| 9M | 2 hrs | 1164 | 3977 | 3339 | 2033 | 3309 | 3834 |
| 9M | 6 hrs | 1517 | 3188 | 3799 | 2670 | 3248 | 4172 |

TABLE 2

Measured Kds of Pu(IV) from nitric acid

| [HNO₃] | Contact Time | Reillex HPQ | resin 6 | resin 7 | resin 8 | resin 9 | resin 10 |
|---|---|---|---|---|---|---|---|
| 1M | 30 min | 6.7 | 1.0 | 0.9 | 1.5 | 2.1 | 2.2 |
| 1M | 2 hrs | 7.1 | 1.0 | 1.5 | 1.7 | 2.2 | 2.2 |
| 1M | 6 hrs | 6.8 | 0.9 | 1.1 | 1.5 | 2.1 | 2.1 |
| 3M | 30 min | 69 | 39 | 52 | — | 122 | 120 |
| 3M | 2 hrs | 97 | 57 | 54 | 92 | 144 | 156 |
| 3M | 6 hrs | 100 | 63 | 56 | 102 | 153 | 163 |
| 5M | 30 min | 233 | 165 | 793 | — | 1431 | 1291 |
| 5M | 2 hrs | 412 | 564 | 788 | 1017 | 1663 | 1880 |
| 5M | 6 hrs | 372 | 713 | 822 | 1373 | 1952 | 2112 |
| 7M | 30 min | 490 | 382 | 5145 | — | 5701 | 4463 |
| 7M | 2 hrs | 850 | 2433 | 4746 | 4698 | 8846 | 6819 |
| 7M | 6 hrs | 683 | 4141 | 5598 | 10,962 | 11,000 | 13,087 |
| 9M | 30 min | 378 | 850 | 5903 | — | 7036 | 6598 |
| 9M | 2 hrs | 1164 | 1003 | 9384 | 6249 | 13,345 | 8971 |
| 9M | 6 hrs | 1517 | 998 | 9581 | 7721 | 13,355 | 11,236 |

TABLE 3

Measured Kds of Pu(IV) from nitric acid

| [HNO₃] | Contact Time | Reillex HPQ | resin 11 | resin 12 | resin 13 | resin 14 | resin 15 |
|---|---|---|---|---|---|---|---|
| 1M | 30 min | 6.7 | 1.9 | 1.2 | 1.2 | — | 1.2 |
| 1M | 2 hrs | 7.1 | 1.5 | 1.3 | 1.2 | — | 1.1 |
| 1M | 6 hrs | 6.8 | 1.6 | 1.2 | 1.7 | — | 1.1 |
| 3M | 30 min | 69 | 61 | 51 | — | — | 51 |
| 3M | 2 hrs | 97 | 72 | 60 | 62 | — | 52 |
| 3M | 6 hrs | 100 | 74 | 60 | 64 | 45 | 53 |
| 5M | 30 min | 233 | 659 | 575 | 722 | 640 | 845 |
| 5M | 2 hrs | 412 | 952 | 752 | 824 | 776 | 1003 |
| 5M | 6 hrs | 372 | 1041 | 893 | 849 | 789 | 998 |
| 7M | 30 min | 490 | 3095 | 3817 | 3782 | 4009 | 4768 |
| 7M | 2 hrs | 850 | 4282 | 4431 | 5910 | 5406 | 6754 |
| 7M | 6 hrs | 683 | 5282 | 4815 | 6870 | 6407 | 6804 |
| 9M | 30 min | 378 | 4331 | 4882 | 7840 | 8006 | 5777 |
| 9M | 2 hrs | 1164 | 7716 | 5592 | 7655 | 8524 | 9657 |
| 9M | 6 hrs | 1517 | 8701 | 7520 | 9114 | 12,005 | 17,365 |

TABLE 4

Measured Kds of Pu(IV) from nitric acid

| [HNO₃] | Contact Time | Reillex HPQ | resin 16 | resin 17 | resin 18 | resin 19 |
|---|---|---|---|---|---|---|
| 1M | 30 min | 6.7 | 1.5 | 0.7 | 0.6 | 1.1 |
| 1M | 2 hrs | 7.1 | 1.2 | 0.7 | 0.7 | 0.9 |
| 1M | 6 hrs | 6.8 | 1.2 | 0.7 | 0.6 | 1.0 |
| 3M | 30 min | 69 | 44 | 37 | 48 | 78 |
| 3M | 2 hrs | 97 | 67 | 43 | 53 | 83 |
| 3M | 6 hrs | 100 | 72 | 43 | 77 | 57 |
| 5M | 30 min | 233 | 227 | 450 | 720 | 1061 |
| 5M | 2 hrs | 412 | 647 | 571 | 843 | 1191 |
| 5M | 6 hrs | 372 | 831 | 681 | 999 | 1405 |
| 7M | 30 min | 490 | 801 | 2232 | 3106 | 5775 |
| 7M | 2 hrs | 850 | 2914 | 3303 | 3719 | 5432 |
| 7M | 6 hrs | 683 | 3698 | 3916 | 6648 | 8288 |
| 9M | 30 min | 378 | 1312 | 3081 | 5549 | 6809 |
| 9M | 2 hrs | 1164 | 3650 | 5320 | 6105 | 9512 |
| 9M | 6 hrs | 1517 | 5469 | 7669 | 9608 | 11,878 |

EXAMPLE 13

Resin 3 was tested with acid-dissolved sludge solution and acidified supernate (simulant solutions for a Hanford Washington waste tank) to measure the Kd values for a series of 14 elements. The measured values shown below in Table 5 provide information about the different elements absorption by the resins and in the case where plutonium is the target metal these data show which elements are likely to interfere or compete with the absorber sites (the selectivity of these resins for the various elements).

TABLE 5

Distribution of Elements

| Solution | Element | 30 minutes | 2 hours | 6 hours |
|---|---|---|---|---|
| Acid-Dissolved Sludge, pH 0.6, 3 g Pu/L | Ce | 23 | 23 | 22 |
| | Cs | 0.4 | 0.4 | 0.4 |
| | Sr | 1.0 | 1.3 | 1.3 |
| | Tc | 24 | 24 | 22 |
| | Y | 1.2 | 1.1 | 1.3 |
| | Cr | 0.4 | 0.6 | 0.7 |
| | Co | <0.1 | 0.3 | 0.1 |
| | Fe | 0.4 | 0.1 | 0.3 |
| | Mn | <0.1 | 0.2 | 0.4 |
| | Zn | 1.7 | 1.3 | 0.7 |
| | Zr | 3.7 | 3.3 | 3.0 |
| | U | 18 | 18 | 17 |
| | Pu | 1053 | 1035 | 1173 |
| | Am | 6.2 | 5.3 | 5.0 |
| Acid-Dissolved Sludge, 60 mg Pu/L | U | 18 | 17 | 17 |
| | Pu | 870 | 1650 | 2185 |
| | Am | 7.9 | 6.3 | 6.0 |
| Acidified Supernate, pH 3.5 | Ce | 1.4 | 1.4 | 1.4 |
| | Cs | <0.1 | <0.1 | 0.1 |
| | Sr | 0.8 | 0.8 | 0.8 |
| | Tc | 48 | 49 | 50 |
| | Y | 0.6 | 0.7 | 0.5 |
| | Cr | 0.6 | 0.5 | 0.6 |
| | Co | 1.1 | 1.3 | 0.9 |
| | Fe | <0.1 | <0.1 | <0.1 |
| | Mn | 0.8 | 0.9 | 0.5 |
| | Zn | 1.7 | 1.3 | 1.5 |
| | Zr | 0.3 | 0.2 | 0.1 |
| | U | 2.0 | 1.4 | 1.5 |
| | Pu | 0.7 | 0.4 | 0.4 |
| | Am | 1.7 | 1.3 | 1.1 |

Although the present invention has been described with reference to specific details, it is not intended that such details should be regarded as limitations upon the scope of the invention, except as and to the extent that they are included in the accompanying claims.

What is claimed is:

1. An anion exchange resin comprised of substantial identical repeating units, said units of a type selected from the group consisting of (a)

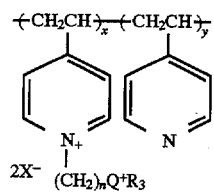

wherein Q is phosphorus, each R is the same and is an alkyl having from 1 to about 6 carbon atoms, n is an integer from 1 to 6, x+y=1 and x is from about 0.2 to about 1.0, and X⁻ is a counterion, (b)

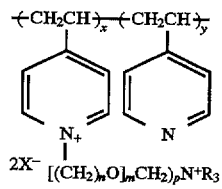

wherein each R is the same and is an alkyl having from 1 to about 6 carbon atoms, n is an integer from 1 to 6, m is an integer from 1 to 4, p is an integer from 1 to 6, x+y=1 and x is from about 0.2 to about 1.0, and X⁻ is a counterion, (c)

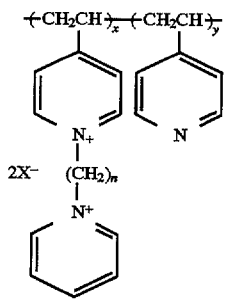

wherein n is an integer from 2 to 6, x+y=1 and x is from about 0.2 to about 1.0, and X⁻ is a counterion, (d)

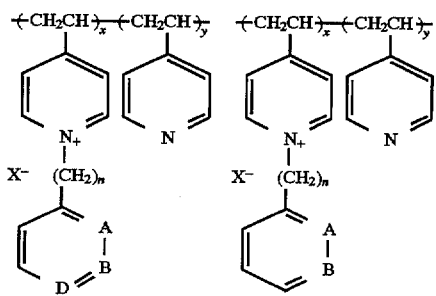

wherein one of A and B is nitrogen, n is an integer from 1 to 6, x+y=1 and x is from about 0.2 to about 1.0, and X⁻ is a counterion, and (e)

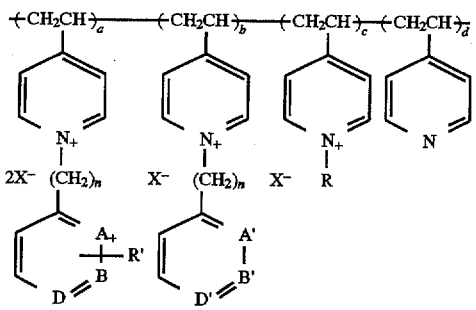

wherein one of A, B and D is nitrogen and one of A', B' and D' is nitrogen, each R and R' is an alkyl having from 1 to about 6 carbon atoms, R' is attached to said A, B or D which is nitrogen, n is an integer from 2 to 6, a+b+c+d=1 and a+b is from about 0.2 to about 1.0, and X⁻ is a counterion.

2. The anion exchange resin of claim 1 wherein the x is from about 0.3 to about 0.8.

3. The anion exchange resin of claim 1 wherein the resin includes substantial identical repeating units of the type:

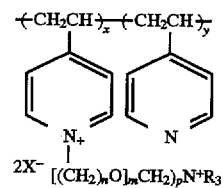

wherein each R is the same and is an alkyl having from 1 to about 6 carbon atoms, n is an integer from 1 to 6, m is an integer from 1 to 4, p is an integer from 1 to 6, x+y=1 and x is from about 0.2 to about 1.0, and X⁻ is a counterion.

4. The anion exchange resin of claim 1 wherein the resin includes substantial identical repeating units of the type:

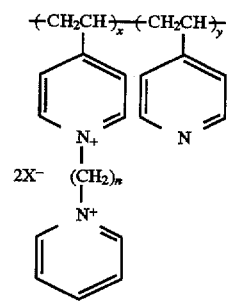

wherein n is an integer from 2 to 6, x+y=1 and x is from about 0.2 to about 1.0, and X⁻ is a counterion.

5. The anion exchange resin of claim 1 wherein the resin includes substantial identical repeating units of the type:

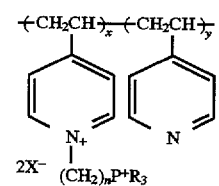

wherein each R is the same and is an alkyl having from 1 to about 6 carbon atoms, n is an integer from 2 to 6, x+y=1 and x is from about 0.2 to about 1.0, and $X^-$ is a counterion.

6. The anion exchange resin of claim 1 wherein the resin includes substantial identical repeating units of the type:

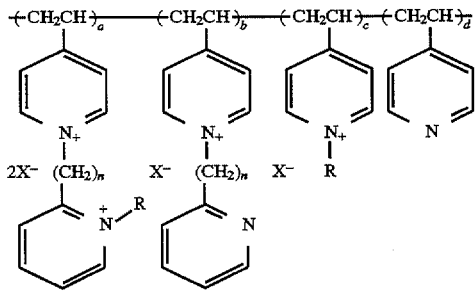

wherein each R is an alkyl having from about 1 to 6 carbon atoms, n is an integer from 2 to 6, a+b+c+d=1 and a+b is from about 0.2 to about 1.0, and $X^-$ is a counterion.

7. The anion exchange resin of claim 1 wherein the resin includes substantial identical repeating units of the type:

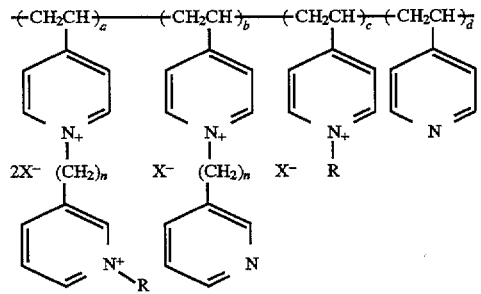

wherein each R is an alkyl having from about 1 to 6 carbon atoms, n is an integer from 2 to 6, a+b+c+d=1 and a+b is from about 0.2 to about 1.0, and $X^-$ is a counterion.

8. The anion exchange resin of claim 1 wherein the resin includes substantial identical repeating units of the type:

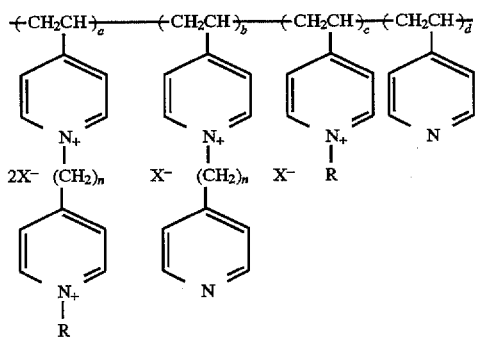

wherein each R is an alkyl having from 1 to about 6 carbon atoms, n is an integer from 2 to 6, a+b+c+d=1 and a+b is from about 0.2 to about 1.0, and $X^-$ is a counterion.

9. The anion exchange resin of claim 1 wherein the resin includes substantial identical repeating units of the type:

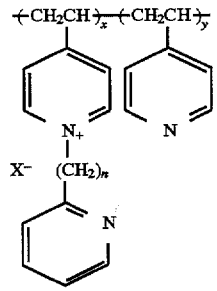

wherein n is an integer from 2 to 6, x+y=1 and x is from about 0.2 to about 1.0, and $X^-$ is a counterion.

10. The anion exchange resin of claim 1 wherein the resin includes substantial identical repeating units of the type:

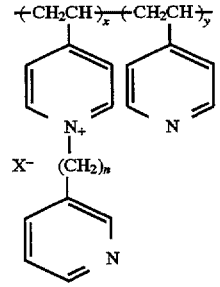

wherein n is an integer from 2 to 6, x+y=1 and x is from about 0.2 to about 1.0, and $X^-$ is a counterion.

* * * * *